United States Patent Office 3,535,302
Patented Oct. 20, 1970

3,535,302
POLYMERIZATION OF PROPYLENE
Arthur D. Ketley, Silver Spring, Md., assignor to W. R. Grace & Co., New York, N.Y., a corporation of Connecticut
No Drawing. Filed Mar. 8, 1968, Ser. No. 711,531
Int. Cl. C08f 1/70
U.S. Cl. 260—93.7   3 Claims

ABSTRACT OF THE DISCLOSURE

This invention relates to the preparation of polymers having the structure of ethylene/propylene copolymers from just one monomer, propylene using a palladium cyanide catalyst.

---

Various methods of preparing ethyene proplene copolymers are well known to those skilled in the art. In all known methods, however, the reactant monomers consist of both ethylene and propylene 10 which are subjected to various catalyst systems, e.g. the Ziegler-type catalyst or Phillips-type cataylst.

One object of the instant invention is to prepare a polymer having the structure of an ethylene propylene copolymer from the single monomer reactant propylene.

This and other objects are accomplished by contacting propylene with a catalytic amount of palladium cyanide, preferably in the presence of an inert diluent at a temperature in the range from about 0° C to 150° C and thereafter recovering an ethylene propylene copolymer.

Cyanide salts are known to polymerize ethylene. See U.S. 3,194,800. The product obtained is a normal high molecular weight homopolymer.

Surprisingly we have found that palladium cyanide when used as a catalyst to polymerize propylene results in a copolymer having the structure

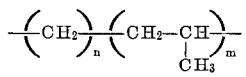

instead of the homopolymer structure

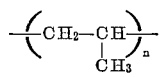

The reaction is unique in the sense that although palladium cyanide polymerizes ethylene to form homopolymer, it will not polymerize 3 methyl-1-butene or 4 methyl-1-pentene under substantially the same conditions of reaction.

Additionally, it has been found that palladium cyanide is unique in that various other palladium salts, e.g. palladium chloride, palladium nitrate, palladium bromide, and palladium sulfate do not polymerize ethylene or propylene.

In carrying out the process of the instant invention, a small amount of catalyst is charged to a suitable pressure reactor together with an inert diluent, if desired. Additionally, is also possible to carry out the reaction in liquid propylene under pressure without the necessity of a separate diluent. The reactor is then pressurized with propylene and heated to a temperature in the range 0 to 150° C for a time sufficient to effect polymerization. The reactor is thereafter depressurized and the catalyst filtered from the system. The remaining filtrate is then washed with an alcohol, e.g. dry methanol to precipitate the copolymer therefrom. The precipitated copolymer is thereafter rewashed, collected and dried.

The propylene polymerization to form an ethylene-propylene copolymer can be performed at a temperature ranging from 0 to 150° C. Temperature control is of importance since it is by this means that the ratio of $-(CH_2)-$ groups to

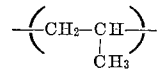

groups in the copolymer product is controlled. By this is meant that at higher temperatures more propylene units are present in the copolymer; whereas at the lower end of the temperature range, greater amounts of methylene groups are formed in the copolymer.

Although the process can be carried out under pressure with liquid propylene as the diluent at a pressure in the range 1–40 atmospheres, various other inert diluents can be employed. The preferred diluents include but are not limited to aromatic and chlorinated hydrocarbons, e.g. benzene, toluene, $ChCl_3$, $CCl_4$, $CH_2Cl_2$, nitroalkanes and the like.

The reaction is usually carried out at a superatmospheric pressure in the range 1–600 p.s.i.

Cocatalysts are not required to be used along with the palladium cyanide. Additionally, the palladium cyanide catalyst concentration is not critical. 0.1 g. to 10 g. palladium cyanide per 100 milliliters of diluent are suitable in carrying out the reaction.

The following examples are set out to explain and expressly not limit the invention. Unless otherwise noted all parts and percentages are by weight.

EXAMPLE 1

2.0 g. of palladium cyanide was placed in an 8 oz. glass pressure bottle and 60 ml. of dry benzene was added thereto. 50 p.s.i. of propylene was added to the pressurized bottle and the reaction mixture was heated to 60° C. After 114 hours the reaction was stopped and the catylst filtered therefrom. The filtrate was added to 500 ml. of dry methanol and the precipitated polymer material was washed by decantation, collected and dried over night in a vacuum oven. 2.3 g. of dry polymer material was obtained. On characterizing the polymers by X-ray diffraction and infrared, the polymer product was shown to be a polymer identical to a known copolymer of 93% ethylene and 7% propylene as shown in X-ray Diffraction Patterns of Polymers, June W. Twiley, Dow Chemical Co., Midland, Mich., 1965.

EXAMPLE 2

Example 1 was repeated except that 60 ml. of toluene was employed as the solvent and the reaction was run at 100° C. 1.8 g. of a polymer with the structure of an ethylene propylene copolymer was obtained.

EXAMPLE 3

Example 1 was repeated except that 60 ml. of chloroform was employed as the solvent instead of benzene and the reaction was run at 25° C. 1.3 g. of a polymer was obtained with the structure of an ethylene propylene copolymer containing 68% ethylene.

EXAMPLE 4

Example 1 was repeated that 60 ml. of nitrobenzene was employed as the solvent and the reaction was run at 75° C. 1.6 g. of a polymer was obtained with the structure of an ethylene propylene copolymer containing 74% ethylene.

EXAMPLE 5

5.0 g. of palladium cyanide that had been ground in a ball mill for 24 hours was added to 60 ml. of dry benzene in an 8 oz. glass pressure bottle. 50 p.s.i. of propylene was added to the bottle and the reaction mixture heated to 61° C. After 137 hours the reaction was stopped and the catalyst filtered therefrom. The filtrate was added to 200 ml. of dry methanol and the precipitated polymer material was washed by decantation, collected and dried overnight in a vacuum oven. The 1.3 g. of polymer obtained had the same structure as in Example 1.

EXAMPLE 6

0.1 g. of palladium cyanide was charged to an 8 oz. glass pressure bottle along with 60 ml. of dry benzene. 50 p.s.i. of propylene was added to the pressure bottle and the reaction mixture was heated to 60° C. After 75 hours the reaction was discontinued and the catalyst filtered therefrom. The filtrate was poured into dried methanol and the precipitated polymer material was washed by decantation, collected and dried overnight in a vacuum oven. The polymer product weighed 0.3 g. and on characterization by X-ray diffraction and infrared was shown to be a copolymer of 90% $-(CH_2CH_2-CH_2)-$ units and 10%

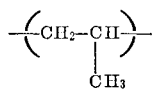

units.

The following example shows that in the instant system a co-catalyst is not required.

EXAMPLE 7

1.0 g. of palladium cyanide was charged to an 8 oz. glass pressure bottle along with 60 ml. of dry heptane. 0.65 g. of aluminum triisobutyl was added to the pressure bottle. Propylene under 50 p.s.i. pressure was thereafter added to the pressure bottle and the bottle was heated to 60° C. After 140 hours the reaction was discontinued and the catalyst filtered therefrom. The filtrate was poured into dry methanol to precipitate the polymer material. The precipitated polymer was washed by decantation, collected and dried overnight in a vacuum oven. The dried copolymer weighed 1.2 g. and had a structure as determined by X-ray diffraction and infrared identical to that shown in Example 1.

The following examples shows the inoperability of the instant catalyst system to polymerize other alpha-olefins.

EXAMPLE 8

2.0 g. of palladium cyanide was charged to an 8 oz. glass pressure bottle along with 60 ml. of benzene. 10 g. of butene-1 were added to the pressure bottle and the bottle was heated at 60° C. for 120 hours. The reaction mixture was filtered to remove the catalyst therefrom and the filtrate was poured into dried methanol. No solid polymer was obtained.

EXAMPLE 9

0.6 g. of palladium cyanide was heated at reflux in 14.1 g. of 4-methyl pentene-1 for 120 hours. The reaction mixture was cooled and poured into methanol to precipitate any polymer present. No solid polymer was obtained.

The ethylene propylene copolymer obtained in the present invention has many and various uses. For example the instant polymerization can be carried out in the presence of a small amount of a comonomer containing two double bonds, e.g. dicyclopentadiene and the resulting polymer can be vulcanized to give ethylene propylene rubbers suitable for use in tire stock. In addition, the ethylene propylene copolymer can be formed into film for packing various items such as vegetables, meats, and the like.

What is claimed is:
1. The process of forming a polymer having the structure of an ethylene/propylene copolymer which consists of contacting solely propylene in an inert diluent with a catalytic amount of palladium cyanide in the range of 0.1 g. to 10.0 g. per 100 ml. of diluent saturated with said propylene at a temperature in the range 0–150° C. and a pressure of 1–600 p.s.i.g. for a time sufficient to form said polymer and recovering said polymer from solution.
2. The process according to claim 1 wherein the inert diluent is a member of the group consisting of aromatic and chlorinated hydrocarbons.
3. The process according to claim 2 wherein the aromatic hydrocarbon is a member of the group consisting of benzene and toluene.

References Cited
UNITED STATES PATENTS
3,194,800  7/1965  Blackham _____ 260—94.9
3,325,463  6/1967  Iwamoto et al. _____ 260—93.7

JOSEPH L. SCHOFER, Primary Examiner

E. J. SMITH, Assistant Examiner

U.S. Cl. X.R.
260—80.78, 88.2